United States Patent [19]

Reeves

[11] Patent Number: 5,009,257
[45] Date of Patent: Apr. 23, 1991

[54] TIRE BREAKER APPARATUS FOR ALL-TERRAIN VEHICLE TIRES

[76] Inventor: Richard R. Reeves, HC 66 Box 36A, Kinder, La. 70648

[21] Appl. No.: 525,401

[22] Filed: May 15, 1990

[51] Int. Cl.⁵ .............................................. B60C 25/02
[52] U.S. Cl. ..................................... 157/1.26; 157/1.3
[58] Field of Search ................... 157/1.17, 1.26, 1.28, 157/1.3

[56] References Cited

U.S. PATENT DOCUMENTS

| | | | |
|---|---|---|---|
| 2,672,185 | 3/1954 | Bergeron | 157/1.26 |
| 3,237,676 | 3/1966 | Wise | 157/1.26 |
| 4,756,354 | 7/1988 | Callas | 157/1.17 X |

Primary Examiner—James G. Smith

[57] ABSTRACT

An apparatus used as an aid in the removal of low-pressure tires from wheels of all-terrain vehicles (ATV's) functioning as a "bead breaker". The tool includes a support base for receiving wheel and tire, a linkage-supporting upright post extending upwardly from said support base, a pair of operators, listed in respect to their actual operating sequence as, (1) an operator for actuating tire sidewall clamping device, (2) an operator for actuating bead press shoe, a bead press shoe and fastening devices for each operator. A unique feature of the tool being its ability to clamp an ATV tire sidewall and hold same in a fixed position relative to the tire bead press shoe thereby insuring collapse of the tire bead during downward movement of tire bead press shoe.

1 Claim, 1 Drawing Sheet

TIRE BREAKER APPARATUS FOR ALL-TERRAIN VEHICLE TIRES

BACKGROUND OF THE INVENTION

1. Field of Invention

This invention generally relates to bead breakers for vehicle tires and more particularly is concerned with a lightweight, portable, simply operated bead breaker for oversize, all-terrain vehicle tires. Said all terrain vehicles sometimes referred to as "3 wheelers" or "4 wheelers".

2. Description of Prior Art

In replacing tires or fixing flat tires, it is necessary to separate the bead of the tires from the rim of the wheel. During normal tire removal, it has been common practice, whether by manual or mechanical means, to apply a force to the tire sidewall, near the tire bead, thereby jarring or prying the tire bead loose from the wheel rim. Due to stiff sidewall construction, normal tires retain a general configuration as said force is applied to the area of the sidewall near the tire bead, thereby transferring said force to the area of the tire bead and effecting separation of the bead and wheel rim. However, off-road, all-terrain vehicles utilize oversized, low-pressure tires having extremely flexible sidewall construction to provide a smooth, bump-free ride over rough terrain. Said extremely flexible sidewall construction does not lend itself for use with prior art tire bead breaking devices, since the flexible tire sidewall does not maintain its general shape and gives way to said force and said force is not transferred to the area of the tire bead. Also, since low air pressure is utilized in ATV tires, most rims for same are provided with a raised annular safety hump or lip adjacent to the tire's inner edge. Although, said lip acts as a retaining flange and provides a safety advantage in that the tire is not easily moved away from the wheel bead seat, it also, makes removing the tire from the rim extremely difficult. Attempts to modify conventional tire changing machines by applying a lateral, inward force concurrent with a downward force to the bead pressing member of said machine, so that the bead pressing member scrapes the tire bead over said annular safety lip generally results in damage being done to the tire. Most service stations will not repair ATV tires, since the only method here-to-fore available envolves breaking the tire bead from the wheel rim by tedious, dangerous and slow, manual methods, generally using a hammer, wedge and pry bar.

SUMMARY OF THE INVENTION

The principal object of this invention is to provide a bead breaking tool for over-sized, low-pressure, all-terrain vehicle tires, which is designed to clamp the flexible tire sidewall in a fixed position relative to the bead pressing member, so that the initial downward movement of the bead pressing member causes the tire bead to break away from its wheel rim seat. Further downward movement of the bead pressing member results in the tire bead being pulled out and over the rim's annular safety lip, thereby freeing the tire for easy removal from the wheel rim.

Another object of the present invention is to provide a tire breaking apparatus, which is of such simplicity and so economically manufactured that it is not an expensive item for service stations to carry. Moreover, it is even practical for the "do it yourself" individual to acquire such a device for his own use.

Yet another object of the invention is to provide a means of compressing a tire sidewall with sufficient force to collapse the tire bead from the wheel flange with minimum effort applied by the worker.

Yet a further object of the present invention is to provide a tire breaking apparatus of the aforedescribed nature which may be used with various sizes of ATV tires and wheel rims without time consuming modification.

DESCRIPTION OF THE PREFERRED EMBODIMENT

Figure 1:
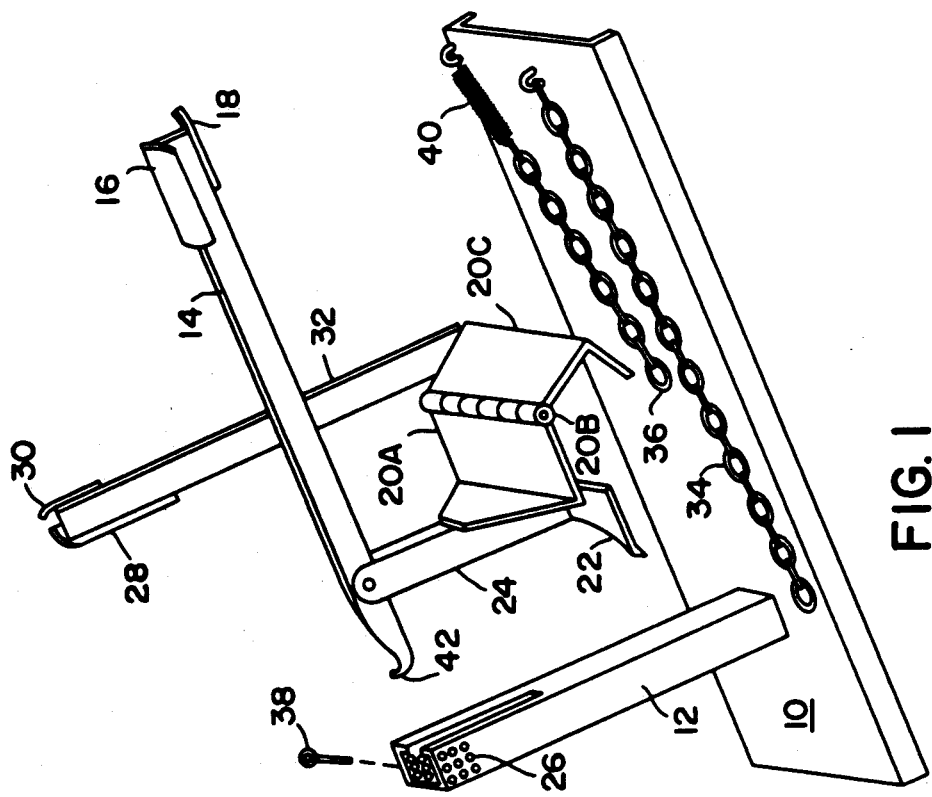
FIG. 1 is a perspective view of the bead breaking apparatus comprising the invention with the bead pressing operator detached from the upright post to allow for positioning tire and wheel on support base.

Referring now specifically to the drawings, there is shown a tire breaking apparatus embodying the present invention for breaking the bead of low-pressure, oversized ATV tires. FIG. 1 shows bead pressing operator 14 detached from upright post 12 to allow for positioning of ATV wheel rim and tire onto support base 10 with said upright post 12 protruding through wheel hub, when said wheel is placed in de-mounting position. Bead pressing operator 14 is detachably connectable at one end to fulcrum pin 38 by hook shaped connector 42. Said bead pressing operator 14 also, pivotally carries a bead press support column 24 which, transfers the mechanically enhanced downward force to the bead press shoe 22 located on lower end of said bead press support column 24. Said bead press shoe 22 is wedge-like in configuration and has an arcuate inboard edge adapted to follow the curvature of the rim's outer edge. Said bead press support column 24 also, carries a tire sidewall clamping device consisting of two jaws, 20A and 20C, pivotally attached to each other by hinge 20B. Said tire sidewall clamping device shown here in a partially closed position. One jaw 20A of said tire sidewall clamping device is rigidly attached to bead press support column 24 and acts as a seat against which the other movable jaw 20C closes to pinch and hold tire sidewall. Rotation of the said jaw 20C about hinge 20B in an opening or closing motion is accomplished by a force being applied to footrest 28 in an appropriate direction perpendicular to tire sidewall clamping device operator 32.

Figure 2:
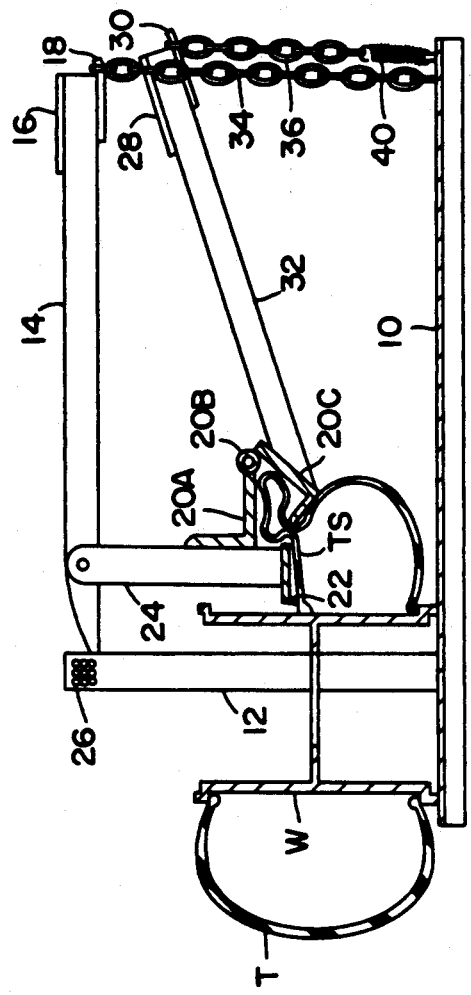
FIG. 2 is a side cross sectional view of the invention in a deployed position.

FIG. 2 shows tire sidewall TS held by said clamping device to insure breaking of bead during downward movement of bead press shoe 22. Adequate torque for clamping tire T is maintained during bead breaking operations by securing chain 36 to hooking device 30 with spring 40 in an elongated position. FIG. 2 also, shows bead pressing operator 14 secured in place by attaching chain 34 to hooking device 18 pursuant to downward force being applied to footrest 16.

Figure 3:
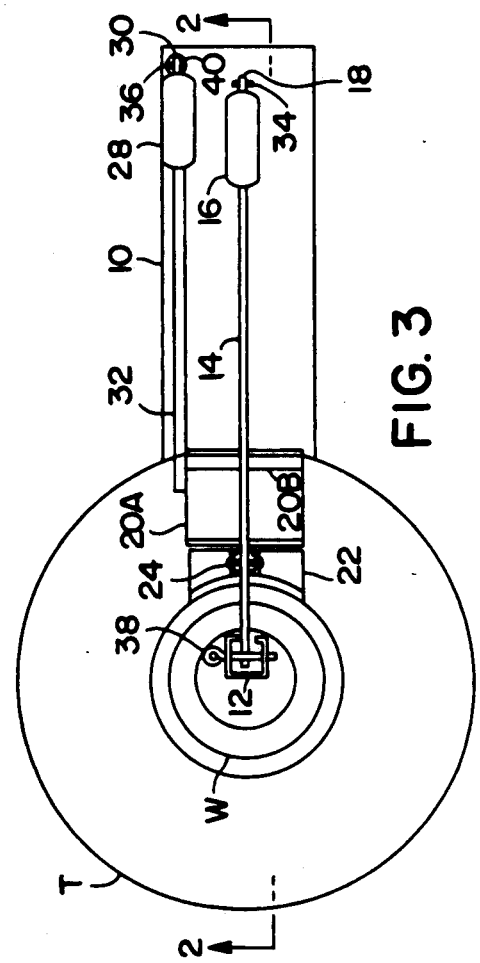
FIG. 3 is a top view of the invention in a deployed position.

FIG. 3 shows lateral clearance of tire sidewall clamping device operator 32 relative to other members of apparatus.

In operation of the aforedescribed ATV tire bead breaker, the tire to be de-mounted is positioned horizontally upon the support base 10 with the upright post 12 protruding through the rim hub. The bead pressing operator 14 is then connected to the fulcrum pin 38 by said operator's hook shaped connector 42. Selection of pin hole 26 to receive fulcrum pin 38 depends upon size of wheel serviced. The bead press shoe 22 is placed to rest upon the tire sidewall TS near the bead. Torque is then applied by the tire sidewall clamping device operator 32 so as to close movable jaw 20C and collapse tire inwardly and eventually pinch tire sidewall TS against fixed jaw 20A. Tire sidewall clamping device operator 32 is then secured in position by attaching chain 36 to hooking device 30 with spring 40 in an elongated position. Spring 40 provides for necessary vertical movement of said clamping device and maintains adequate torque for clamping tire sidewall TS. Downward force is then applied to footrest 16 actuating a mechanically enhanced downward movement of the bead press shoe 22 and effecting separation of tire bead from wheel rim seat. Any tendency of the tire sidewall TS to roll down due to its flexible nature during the downward movement of the bead press shoe 22 is precluded by the holding feature of said tire sidewall clamping device in which the tire sidewall TS is held in a fixed position relative to the bead press shoe 22. In stubborn cases, where excessive amounts of rust exist on the wheel rim W and breaking of the bead cannot easily be accomplished, the bead pressing operator 14 can be secured in a down position to maintain force to the bead press shoe 22. Said securing of the bead pressing operator 14 is accomplished by drawing chain 34 taut and attaching same to hooking device 18. Securing the bead press operator 14 in this manner frees a worker to use other additional means to help unseat a difficult bead bond, such as striking the tire T with a hammer.

Various changes and modifications, including adapting this invention for use with pneumatic or hydraulic power, may be made with respect to the foregoing detailed description without departing from the spirit of the embodiment invention.

What is claimed and desired to be protected by U.S. Letters Patent is:

1. A bead breaker for displacing the bead of a deflated ATV tire from the flange of a wheel upon which said tire is mounted by uniquely clamping the tire sidewall in a fixed position relative to the bead pressing member, so as to insure breaking of the bead during downward movement of the bead pressing member with said bead breaker comprising;

a stand having a wheel and tire receiving horizontal support base and a linkage supporting upright post extending upwardly and perpendicularly therefrom;

the upright post having multiple pin holes on upper extermity to provide alternative fulcrum pin locations, both horizontally and vertically;

a bead pressing operator detachably connected at one of its ends to the said upright post by a hook shaped connector;

the bead pressing operator pivotally connected at said one of its ends to the upper extremity of said upright post by fulcrum pin;

the bead pressing operator having a footrest near its opposite free terminus for applying force;

the bead pressing operator having a fastening means interactive between said bead pressing operator's free terminus and a point below on the support base to releasibly immobilize said bead pressing operator in a deployed position;

a bead press support column pivotally connected at its upper terminus to said bead pressing operator and with a bead press shoe fixed to its lower terminus;

a first jaw fixed perpendicular to said press support comumn and disposed in a position to lie immediately above tire sidewall;

a second jaw pivotally connected to said first jaw so as to allow said second jaw to close against said first jaw;

a tire sidewall clamping device operator rigidly connected to said second jaw at such an angle to render said operator in a nearly horizontal position when said second jaw is closed against said first jaw;

the tire sidewall clamping device operator rigidly connected to said second jaw at such an offset measured along its pivotal axis to allow clearance between the working plane of said tire sidewall clamping device operator and other parts;

the tire sidewall clamping device operator having a footrest near its free terminus for applying force;

the tire sidewall clamping device operator having a fastening means interactive between said tire sidewall clamping device operator's free terminus and a point below on the support base to releasibly immobilize said tire sidewall clamping device operator in a fixed position relative to the bead press shoe;

said tire sidewall clamping device operator fastening means to include a chain with spring to allow for movement of said tire sidewall clamping device operator with respect to support base.

* * * * *